(12) United States Patent
Joswig

(10) Patent No.: US 12,208,586 B2
(45) Date of Patent: Jan. 28, 2025

(54) CONVEYOR BELT, IN PARTICULAR SPINDLE TAPE, WITH ULTRASOUND OR LASER CUT LATERAL SIDES

(71) Applicant: Habasit AG, Reinach (CH)

(72) Inventor: Maren Joswig, Blauen (CH)

(73) Assignee: Habasit AG, Reinach (CH)

(*) Notice: Subject to any disclaimer, the term of this patent is extended or adjusted under 35 U.S.C. 154(b) by 0 days.

(21) Appl. No.: 17/784,077

(22) PCT Filed: Dec. 9, 2020

(86) PCT No.: PCT/EP2020/085348
§ 371 (c)(1),
(2) Date: Jun. 9, 2022

(87) PCT Pub. No.: WO2021/116209
PCT Pub. Date: Jun. 17, 2021

(65) Prior Publication Data
US 2023/0054996 A1 Feb. 23, 2023

(30) Foreign Application Priority Data

Dec. 10, 2019 (EP) ..................... 19214896

(51) Int. Cl.
| B29D 29/06 | (2006.01) |
| B65G 15/34 | (2006.01) |
| F16G 1/10 | (2006.01) |

(52) U.S. Cl.
CPC ........... *B29D 29/06* (2013.01); *B65G 15/34* (2013.01); *F16G 1/10* (2013.01)

(58) Field of Classification Search
CPC ........ B29D 29/06; B65G 15/34; D01H 1/241; F16G 1/10
USPC ........................................ 198/847
See application file for complete search history.

(56) References Cited

U.S. PATENT DOCUMENTS

| 4,097,327 A | 6/1978 | Calemard |
| 4,154,335 A * | 5/1979 | Burnett ............... B32B 5/26 198/847 |

(Continued)

FOREIGN PATENT DOCUMENTS

| CN | 202106400 U | 1/2012 |
| CN | 104227782 A | 12/2014 |

(Continued)

OTHER PUBLICATIONS

Ultrasound Conveyor Belt Fabric Cutter, Ultrasound Conveyor Belt Fabric Cutter Suppliers and Manufacturers, Alibaba.com, Sep. 14, 2017, 6 pages.

(Continued)

*Primary Examiner* — Mark A Deuble
(74) *Attorney, Agent, or Firm* — Hodgson Russ LLP

(57) ABSTRACT

A conveyor belt, power transmission belt or machine tape (1) being open-ended with two ending edges (6, 7) and with a longitudinal length (L) in a longitudinal direction, comprising: a) two parallel lateral edges (1a, 1b) running in said longitudinal direction, and being spaced apart from each other by a transversal width (W); b) a first textile layer (2); c) a first coating layer (3); and optionally d) one more through holes (5) perforating the belt through its overall thickness (T), each of these through holes (5) being formed by a hole edge (5a); characterized in that i) the first textile layer (2) comprises fibres or filaments of a thermoplastic and/or the first coating layer (3) comprises a thermoplastic or thermoplastic elastomer; and ii) the lateral edges (1a, 1b) are ultrasound-cut or laser-cut and/or the optional hole edge(s) (5a) is(are) laser-cut. The belt or tape has melt-sealed edges, can be made endless by conventional end-joining and can be used in fluff-generating environments, such as a spindle tape.

16 Claims, 4 Drawing Sheets

(56) References Cited

U.S. PATENT DOCUMENTS

| | | | |
|---|---|---|---|
| 4,693,771 A | 9/1987 | Payet et al. | |
| 5,230,761 A | 7/1993 | Crawford | |
| 5,342,250 A | 8/1994 | Sanders | |
| 5,558,207 A * | 9/1996 | Zabron | B65G 15/34 198/847 |
| 5,697,491 A * | 12/1997 | Alex | B65G 15/38 198/846 |
| 7,074,729 B2 * | 7/2006 | Leighton | B65G 15/34 442/164 |
| 8,573,390 B2 * | 11/2013 | Andrews | B65G 15/38 198/847 |
| 8,708,135 B2 * | 4/2014 | Lin | B65G 21/2036 198/689.1 |
| 9,974,239 B2 * | 5/2018 | Behrens | B65G 15/36 |
| 11,306,437 B2 | 4/2022 | Straub | |
| 2020/0391459 A1 * | 12/2020 | Okamoto | B29C 43/3642 |
| 2020/0399829 A1 | 12/2020 | Straub | |

FOREIGN PATENT DOCUMENTS

| | | |
|---|---|---|
| CN | 106003750 B | 12/2017 |
| EP | 0143513 A2 | 11/1983 |
| EP | 0202676 A2 | 11/1986 |
| EP | 1394316 A2 | 3/2004 |
| EP | 0534300 A1 | 3/2019 |
| JP | S59-182723 A | 10/1984 |
| JP | 2003048256 A | 2/2003 |
| JP | 2003-136609 A | 5/2003 |
| JP | 2003-211554 A | 7/2003 |
| JP | 2019038694 A | 3/2019 |
| WO | 2006/045595 A1 | 5/2006 |
| WO | 2010/088280 A1 | 8/2010 |

OTHER PUBLICATIONS

Decoup, Conveyor belts fabrics cutting, Advertisement for ultrasonic MBT cutting bench, Nov. 22, 2018, 2 pages.

Duboust, A., et al., An optical method for measuring surface roughness of machined carbon fibre-reinforced plastic composites, Journal of Composite Materials, May 2016, vol. 51, No. 3, pp. 289-302.

Setina, J., et al., Volume Determination of a Vacuum Vessel by Pressure Rise Method, XIX IMEKO World Congress, Fundamental and Applied Metrology, Sep. 6-11, 2009, pp. 2096-2098.

* cited by examiner

CONVEYOR BELT, IN PARTICULAR SPINDLE TAPE, WITH ULTRASOUND OR LASER CUT LATERAL SIDES

FIELD OF THE INVENTION

The present invention relates to a belt, in particular a conveyor belt, machine tape, power transmission belt or spindle tape, and to processes for its manufacture.

BACKGROUND ART

Conveyor belts, power transmission belts or machine tapes are customarily cut as strips out of a master sheet material of much larger width. The most customary cutting techniques therefore have been either knife cutting or punching.

These cutting techniques have the disadvantage that the edges so produced have cut filament ends which cause the edge to be prone to fraying and to picking up of dirt and moisture.

On the other hand, ultrasound cutting and laser cutting of edges has been known in the field of plain textiles. It has been observed there that the cut edges so produced are molten to at least in part, and that near the edges so formed the textile may have a thickness greater than at the bulk of the textile, that is, the textile tends to bulge up near such ultrasound-cut or laser-cut edge.

Publications concerned with ultrasound cutting of plain textiles are, by way of example:

EP 0 143 513 A2 discloses ultrasound cutting of an uncoated and non-impregnated textile fabric, and ultrasonic cutting and sealing means that cut off undesirable selvage from the fabric and seal the longitudinal cut edges thereof.

CH 604 930 A5 discloses an ultrasound cutting apparatus for textile articles. The textile itself is not further specified. This publication mentions the problem of bulked-up edges ("surépaisseurs") with hot-cut, molten edges. Its solution to this problem is that the ultrasound cutter and the anvil should be mounted to one and the same support ("support commun"). The disclosed apparatus, when cutting in longitudinal direction, has two sonotrodes each acting on a single ultrasound blade. The ultrasound frequency is said to be 20 kHz; the advancing speed of the ultrasound cutters is not disclosed.

U.S. Pat. No. 4,693,771 A discloses an ultrasound cutting method for an uncoated and non-impregnated woven textile fabric for removing selvage, wherein 2-4 parallel warp or weft yarns near the ultrasound cut edge are fused to a fused mass. The ultrasound-cut edge tapers from the bulk of the fabric towards the apex of the edge, which is achieved by using a custom-designed anvil. The disclosed apparatus has two ultrasound sonotrodes each acting on a single ultrasound blade. This publication hints at a relation between ultrasound frequency and advancing speed of the ultrasound cutters, in order to achieve sufficiently sealed edges.

U.S. Pat. No. 5,230,761 discloses the manufacture of a waistband, wherein a fabric having a thermoplastic finish undergoes ultrasound cutting along lines substantially parallel to the warp yarns. The finish is said to be applied or coated onto the fabric or web but is also asked to hold the the fill and warp yarns together, so it is disclosed as a fabric impregnation. Seven knives per 7 to 9 inches of horn width may be used, giving cut waistbands of transversal width in the range of 25.4 mm to to 32.7 mm. This ultrasound cutting process apparently produces bulged-up edges.

The cutting of the abovementioned master sheet material for conveyor belts may also already have been accomplished using ultrasound. Applicant observed on the internet an advertisement by the French company Decoup (an affiliate of Spoolex) according to which they offer such a master sheet cutting machine with a a plurality of sonotrodes of 20 kHz, each of these acting onto a single ultrasound blade.

Furthermore it appears that ultrasound-cutting of conveyor belts to a suited length (that is, transversally) has been known. CN104227782 discloses an ultrasound cutting machine wherein a belt 10 is transversally cut with an ultrasound cutter to different end faces. On the internet (e.g. on Alibaba) there are available hand-held ultrasound cutters for such purpose.

Laser cutting of textiles has also been known. Laser cutting has been advertised as suitable for obtaining lateral sides wherein the layers are molten-together. EP 1 394 316 discloses a layered compound consisting of a fabric and a bottom adhesive layer, in particular of TPU. This bottom adhesive layer is heated up such that it penetrates into the textile, following which the adhesive layer and optionally also the textile are pressed and flattened to form a planar surface. The fabric with adhesive penetrated there into is said to be well suitable for laser cutting or laser perforation, but does not disclose by itself any laser-cut products prepared therefrom. Abovementioned U.S. Pat. No. 4,693,771 A teaches against laser-cutting on grounds that it produces "blackened edges" and "little, if any sealing which resulted in no durability to washing out of the cut edges".

A known technique in the field of conveyor belts to form non-fraying lateral belt edges has been to weld a seam of a thermoplastic material onto the edges previously formed by cold knife cutting or punching. Another such technique has been to first form the lateral edges of the belt by cold knife cutting or punching, to then apply a further layer of a thermoplastic or thermoplastic elastomer of slightly greater width onto the belt, such that there is a slight protrusion of thermoplastic or thermoplastic elastomer layer over either of the two edges, and to bend the excess width of the thermoplastic or thermoplastic elastomeric layer over the cut edges and to fuse it there onto. Belts of these two types are on the market and are advertised as having "non-fraying edges".

The term "sonotrode" is commonly used for an ultrasound-driven support that holds one or more cutting blades.

It appears that most known ultrasound textile cutting apparatuses with a plurality of sonotrodes, wherein each sonotrode acts on only one cutting blade, do not allow a sufficiently close spacing of the cutting blades in transversal direction such as to directly cut conveyor belts or machine tapes, due to the sheer transversal dimensions of the sonotrodes themselves.

On the other hand, in the field of food processing ultrasound cutters are known wherein one sonotrode drives a plurality of cutting blades, arranged closely to each other in transversal direction, and which are configured as one single tool. The ultrasound cutter must however operate at the resonance frequency of the combination of sonotrode plus cutting blade(s). Having a plurality of cutting blades adds up to the weight of said combination, and thus to its inertia, which lowers the resonance frequency. Furthermore the cutting resistance that the sonotrode must overcome increases linearly with the number of cutting blades attached to it, possibly also causing the ultrasound cutter to drop out of resonance. Industrial textiles are thus always cut with with an ultrasound cutter having one sonotrode operating on only one blade, that is, with a numerical ratio of sonotrodes to cutting blades of 1:1.

There is the problem of providing a belt of the foregoing types that has non-fraying edges, that retains near the edges a thickness similar or even equal to the thickness at the bulk of the belt, and which is easier to produce than the above-mentioned prior art commercial belts with "non-fraying edges".

SUMMARY OF THE INVENTION

The invention provides:
1. A belt being either open-ended with a longitudinal length L in a longitudinal direction or being endless with a perimeter L, the belt comprising:
   a) two parallel lateral edges (1a,1b) either running in said longitudinal direction or forming said perimeter, respectively, and being spaced apart from each other by a transversal width W;
   b) a first textile layer;
   c) a first coating layer; and optionally
   d) one more through holes (5) perforating the belt through its overall thickness T, each of these through holes (5) being formed by a hole edge (5a); characterized in that
   i) the first textile layer comprises fibres or filaments of a thermoplastic, and/or the first coating layer comprises a thermoplastic or thermoplastic elastomer; and
   ii) the lateral edges are ultrasound-cut or laser-cut and/or the optional hole edge(s) is(are) laser-cut.
2. The belt according to above [1], wherein the first textile layer comprises natural fibres or natural filaments.
3. The belt according to above [1] or [2], wherein the first textile layer comprises fibres or filaments of a polyester, in particular PET.
4. The belt according to anyone of the above items, wherein the first coating layer consists of a TPU.
5. The belt according to anyone of the above items, wherein said transversal width is in the range of 10 to 25 mm, preferably 10 to 20 mm.
6. The belt (1) according to anyone of the preceding items, comprising one or more of said through holes (5) and the hole edge(s) (5a) of the through hole(s) (5) is(are) laser-cut.
7. The belt according to anyone of the above items, wherein said two lateral edges are ultrasound-cut or laser-cut.
8. The belt according to anyone of the preceding items, which is devoid of through holes and wherein said two lateral edges are ultrasound-cut or laser-cut.
9. The belt according to anyone of the preceding items, which is open-ended and has two ending edges which are spaced apart from each other in said longitudinal direction by said longitudinal length L and are ultrasound-cut or laser-cut.
10. A process for the simultaneous production of N specimens of the belt according to anyone of the preceding items in open-ended form and with ultrasound-cut lateral edges, wherein N is an integer number≥1, comprising the steps of:
    i) providing a layered sheet material of essentially rectangular shape having a layer structure as defined in one of above [1] to [4], a longitudinal length greater than or equal to L and a transversal width $W_0$ which is greater than N×W;
    ii) passing said layered sheet material through an ultrasound cutter having at least one sonotrode and N+1 blades, wherein adjacent blades are spaced apart from each other by that distance W, such that each of the blades cuts into the sheet material, to simultaneously cut the sheet material into said N belt specimens; and iii) optionally, forming one or more through hole(s) (5) into each of the said N belt specimens by laser-cutting.
11. The process of above [10], wherein the ultrasound cutter has M sonotrodes, each i-th sonotrode driving $K_i$ blades, wherein M and each $K_i$ are integer numbers≥1, and wherein $$N = \sum_{i=1}^{M} K_i - 1.$$

12. The process of above [10] or [11], wherein the blade(s) is(are) circular disk blade(s) (10) having peripheral circular cutting faces (10a), and the circular disk blade(s) (10) roll over the layered sheet material during ultrasound cutting of the belt specimen(s).
13. The process of anyone of above [9] to [12], wherein the layered sheet material is passed through the ultrasound cutter at an advancing speed in the range of 2 to 10 m/min, preferably 3 to 8 m/min, using in each sonotrode an ultrasound with a frequency of 30 kHz and power of 250 to 350 W per blade attached to that sonotrode.
14. A ring spinning frame with two, four or eight spindle tape drives, comprising as the spindle tapes belts according to above [5].

DETAILED DESCRIPTION OF THE INVENTION

Figure 1:
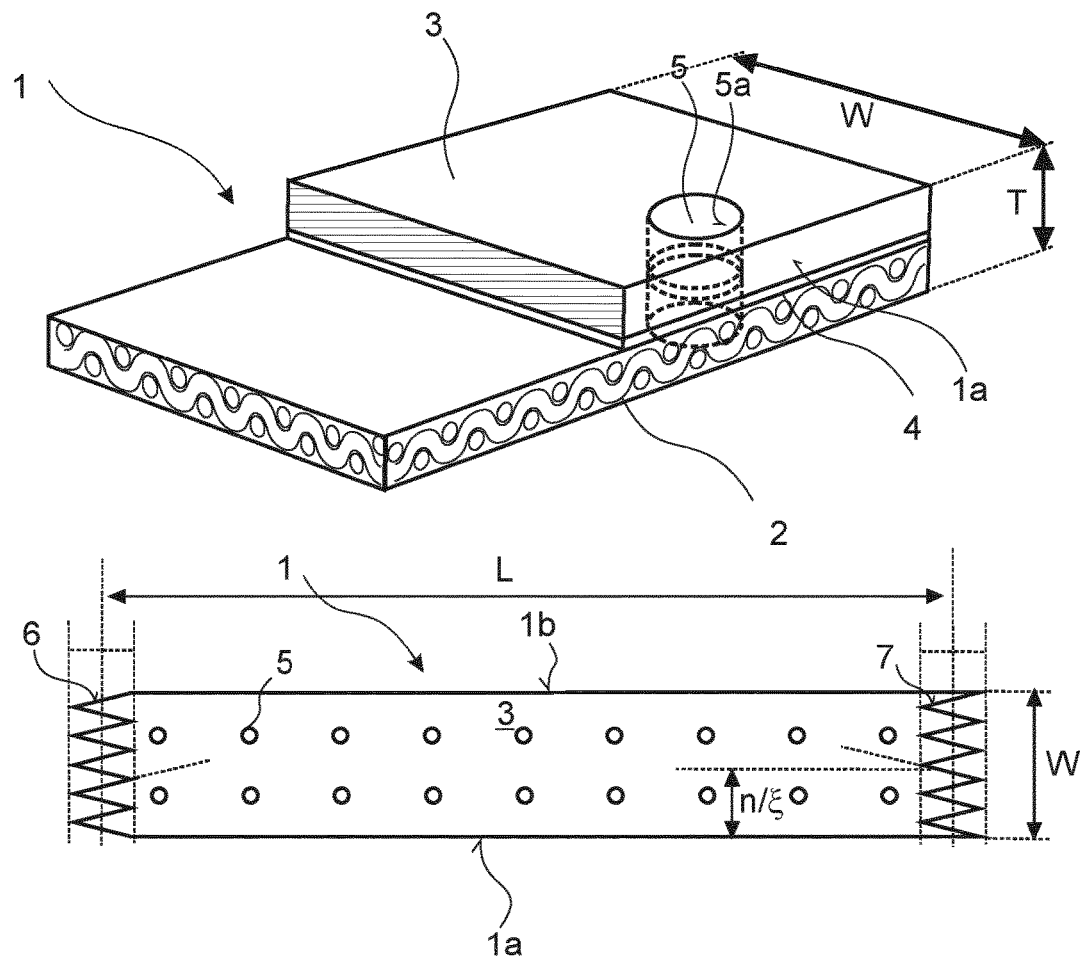
FIG. 1 shows a schematic representation of a spindle tape of the invention.

The belt or tape of the invention has at least one ultrasound-cut or laser-cut edge. An "edge", as used herein without further specification, means for the purposes of the invention one or more of the following:

a) a lateral edge of the belt or tape, running essentially or even exactly in parallel to the belt's or tape's travel direction; preferably both lateral edges of the belt or tape;
b) an ending edge, that is, one of the two belt's or tapes edges spaced apart from each other in longitudinal direction L, which edges will make the belt or tape endless, after joining them together, e.g. by heat and pressure and an optionally co-used hot-melt adhesive; these ending edges are preferably either straight or in the form of a saw-toothed so-called "fingerend" edge (see also below);
c) an edge of a trough hole cut passing through the entirety of the belt's thickness;
d) a combination of two or more of above a), b), and c).

Alternatively, the individual types of edges will be designated herein specifically following above a)-c), where necessary or appropriate.

Feature ii) of item [1] of the summary of the invention and of claim 1 means that there must be at least lateral edges (1a,1b) which are ultrasound-cut or laser-cut, or, if the lateral edges are neither ultrasound-cut nor laser-cut, then there must be one or more through holes (5) with laser-cut hole edge(s) (5a).

Any ultrasound or laser-cut edge has the following structural effects observable on the edge so formed:
a) The material of the first textile layer and/or the material of the first coating layer appear as re-solidified after an at least partial softening or even melting, to the extent that any of these layers comprises, or consists of, a thermoplastic or thermoplastic elastomer. Any fibre ends of the first textile layer that would normally protrude as sharp tips out of the cut edge, if the cutting had been done by knife or punching, appear blunt by said softening or melting and re-solidification when cutting by ultrasound or laser, and/or are embedded at least in part in thermoplastic/thermoplastic elastomeric material from the first textile layer and/or the first coating layer.
b) The porosity or fluffiness of the first textile layer itself is reduced, with respect to the porosity or fluffiness of the fabric as visible at the said longitudinal cross-section.

Furthermore ultrasound and laser-cut edges differ from each other in that the latter may exhibit traces of yellowish, or dark, or possibly near black, deposits originating from charring or even carbonisation of organic material at the newly formed edge due to the laser heat.

Still furthermore, ultrasound-cut and laser-cut edges differ in surface roughness from each other and from a conventional knife-cut edge, in particular when the surface roughness along the first textile layer is measured.

In the case of a longitudinal or ending edge the edge roughness is measured for the purposes of the invention along any of the contained layers, in particular along the first textile layer, as a height profile z(x) using focus variance, which is a well-known optical height profile measurement technique. The edge to be analysed is considered as extending in the x (horizontal) and y(vertical) directions, and the profile height is considered as extending in the z direction. If the edge to be analysed is a lateral edge then the x-direction coincides with the longitudinal belt direction, the y-direction coincides with the belt's thickness direction and the z-direction coincides with the belt's transversal direction. A surface section of the the edge is digitally grayscale photographed at a given constant distance between lens and belt specimen and at given focus. The same surface section of the edge is then digitally grayscale re-photographed at the same distance between lens and belt specimen but at different foci, each focus being moved by a fine-tuning focal movement mechanism, e.g. by a piezoelectric element, until at a given focus, a photograph is obtained wherein the centre of that surface is best-in-focus. The centre of that surface section is one measurement point $x_i$ of the edge. The criterion of best-in-focus of the centre at position $x_i$ may be given e.g. if the Laplacian filter L $$L = I(m,n+1) + I(m+1,n) + I(m,n-1) + I(m-1,n) - 4I(m,n) \approx \qquad (1)$$

wherein in formula (1)
I(m,n) is the grayscale intensity of the image pixel representing the centre of the surface, to which centre the distance (thus the height in z-direction) shall be measured;
I(m,n+1), I(m+1,n), l(m,n−1) and I(m−1,n) are the grayscale intensities of image pixels adjacent to the centre pixel and being above (offset by +1 in y-direction), right of (offset by +1 in x-direction), below (offset by −1 in y-direction), and left of (offset by −1 in x-direction) the centre pixel, respectively; and "∼ 0" means that L shall be minimal, or be closest possible, to zero.

In formula (1) the values I(m,n), I(m,n+1), I(m+1,n), I(m,n−1) and I(m−1,n) may preferably each be replaced by its corresponding 2×2 or 3×3 neighbourhood arithmetic average value, to reduce noise sensitivity of the Laplacian filter.

The foregoing best-in-focus criterion, once fulfilled for the centre of the surface section in question as the given measurement point $x_i$, is then converted to an absolute distance $z_i$ between photographic camera and centre of the surface section corresponding to that $x_i$, using e.g. the Gaussian lens law:

$$\frac{1}{o} + \frac{1}{d} = \frac{1}{f}$$

wherein
o is the unknown distance between the centre plane of the lens of the photographic camera and the centre of the surface;
d is the known distance between the centre plane of the lens of the photographic camera and the CCD of the digital photographic camera and which is variable by the focal mechanism and which is chosen such that the best-in-focus criterion for the centre of the surface section is obtained; and
f is the known focal distance of the lens of the photographic camera (a lens specific constant);
the Gaussian lens law is solved for the unknown o; and $z_i$ corresponding to $x_i$ may e.g. be directly equal to said o, or may be the sum of said o plus a constant, arbitrarily chosen scaling offset.

The above photographic process and distance evaluation is repeated for other measurement points along the edge (that is, for other surface sections thereof), each next measurement point $x_{i+1}$ being shifted by some further, typically constant offset in x-direction with respect to the previous measuring point $x_i$, until said height profile z(x) is completed.

For such height profile determination by focus variance even commercial devices exist.

This technique allows to measure height profiles along the edges of individual layers within an inventive belt or tape specimen, such as along the edge of the first textile layer. In order to measure such height profile z(x) along the edge of a layer the belt or tape specimen is sandwiched between two rigid cuboid blocks having planar surfaces, such that the lateral or ending edge to be measured is flush with one of the lateral sides of each of the two cuboid blocks. In this sandwiched state the belt or the tape specimen, with the lateral or ending edge to be measured pointing upwards, may be advanced in measuring (x−) direction using, typically, a motor-driven advancing support. The result of the measurement is a one-dimensional transversal height profile z(x) of the edge as a function of a variable position x along the layer in question. By way of example reference is made to the article "An optical method for measuring surface roughness of machines carbon fibre reinforced plastic composites" in Journal of Composite Materials 0(0), pp. 1-14 (2016). The measurement of the height profile z(x) will be typically at a vertical height y which is half the thickness of the layer whose roughness is to be measured.

The surface roughness of the longitudinal or ending edge along the examined layer, as obtained by above focus variance, is then characterised using that height profile z(x) using the well-known standard deviation (s) skewness (Rsk), kurtosis (Rku) parameters:

$$s = \sqrt{\frac{1}{N}\sum_{i=1}^{N}[z_i(x_i) - \bar{z}]^2} \quad (2c)$$

$$Rsk = \frac{1}{Ns^3}\sum_{i=1}^{N}[z_i(x_i) - \bar{z}]^3 \quad (2b)$$

$$Rku = \frac{1}{Ns^4}\sum_{i=1}^{N}[z_i(x_i) - \bar{z}]^4 \quad (2c)$$

wherein $x_i$ is the displacement of the i-th measuring point in the advancing (x−) direction along that edge, with respect to the starting point of the advancing movement;

$z_i$ is the height measured at the i-th measuring point at said displacement $x_i$, measured by focus variance as explained above;

N is the number of measurement points along the edge for which a corresponding height $z_i(x_i)$ is measured;

the sums run over all N measurement points;

$$\bar{z} = \frac{1}{N}\sum_{i=1}^{N}[z_i(x_i)],$$

wherein all symbols are as defined for formulae (2a), (2b) and (2c); and all sums run over all measurement points.

The surface roughness of knife-cut, laser-cut and ultrasound-cut lateral or ending edges, particularly when measured along the first textile layer, differ from each other, when measured as a height profile z(x) and characterized using said Rsk and Rku. The absolute values of Rsk and Rku of a knife-cut, ultrasound-cut or laser-cut lateral or ending edge depend on the belt construction and on cutting process features and cannot be indicated in advance in absolute values or absolute value ranges for the belts or tapes of the invention. This is however not necessary for the purposes of the invention.

The Rsk per above formula (2b) is predicted to be most positive for a laser-cut edge (the height profile z(x) tails only towards the inside bulk of the belt or tape), is predicted to be less positive for an ultrasound-cut edge and may become least positive, or even closest to zero, for a knife cut-edge. This is because the temperature gradient from outside (at the edge to be cut) to the inside (bulk) of the belt is highest in laser-cutting, is lower in ultrasound cutting and becomes virtually absent in knife-cutting. Thus, by knife-cutting a specimen of an inventive belt or tape, such that the new knife-cut reference edge(s) run in parallel to the belt or tape specimen's original lateral or ending edges, and measuring/analysing both the original lateral or ending edges of the belt or tape and the newly formed knife-cut reference edge(s), and comparing their Rsk values of above formula (2b), it is firstly possible to determine whether the original lateral or ending edges of the belt or tape specimen were on the one hand knife-cut, or were on the other hand laser—or ultrasound-cut. In the former case there should be no statistically significant difference between the Rsk value of the original lateral or ending edge and the Rsk value of any of the newly knife-cut reference edge(s). In the latter case an original lateral or ending edge should have an Rsk value which is significantly more positive than the Rsk value of one of the newly knife-cut reference edge(s).

The standard deviation s per above formula (2a) of a laser-cut lateral or ending edge is predicted to be lower than the s per above formula (2a) of either an ultrasound-cut or knife-cut lateral or ending edge. The Rku per above formula (2c) of a laser-cut lateral or ending edge is predicted to be higher than the Rku of either an ultrasound-cut or knife-cut lateral or ending edge. This is because the laser gives the sharpest cuts, and thus the smoothest edges, of all three techniques.

Thus, by effecting into a specimen of an inventive belt or tape one or more reference cut(s) by ultrasound, under ultrasound cutting conditions that give cuts closest in appearance to the original lateral or ending edges of the belt or tape specimen, and such that the newly cut reference edges run(s) in parallel to the belt or tape specimen's original lateral or ending edges, and measuring/analysing both the original lateral or ending edges of the belt or tape and the newly formed cut reference edge(s), and comparing their s values of above formula (2a) or their Rku values of above formula (2c), it is secondly possible to determine whether the original lateral or ending edges of the belt or tape specimen were on the one hand laser-cut, or were on the other hand ultrasound- or knife-cut. In the former case the s value of an original lateral or ending edge should be lower than the s value(s) of one of the newly ultrasound-cut reference edges; and the Rku value of an original lateral or ending edge should be higher than the Rku value(s) of one of the newly ultrasound-cut reference edges. In the latter case the s or Rsk value, respectively, of an original lateral or ending edge should not be statistically significantly different from, or be significantly higher than, the s or Rsk value(s), respectively, of one of the newly ultrasound-cut reference edges.

If the belt or tape of the invention contains a woven first textile layer then abovementioned reference edge(s) for the determination of a lateral edge is(are) preferably made at an offset in z-direction from that lateral edge which is an integer multiple of the inverse of the woven fabric's spatial frequency $\xi$ in that z-direction, i.e. at $n/\xi$, wherein n is an integer≥1. Otherwise the comparison of the surface roughnesses of lateral edge and reference edge will not be meaningful.

The position of such further reference cut at offset $n/\xi$ from a corresponding lateral belt edge is shown as a dashed line in the bottom part of FIG. 1.

For each ending edge in the form of a saw-toothed so-called "fingerend" edge (see also below) the corresponding further reference cut edge(s) is(are) simply made as a straight prolongation thereof into the belt or tape. Such prolongated further cuts of two saw-tooth edges are again shown with dashed oblique lines in the bottom part of FIG. 1.

Any such reference knife-cut edge may be made e.g. using a trimmer, e.g. the IDEAL trimmers provided by Krug & Priester, Germany.

It is understood that any such further reference cut(s) shall avoid any trough holes that might be present in the belt, as also shown by the dashed reference cut lines in the bottom part of FIG. 1.

In the case of a hole edge the edge roughness cannot be directly determined by the foregoing method. If however the hole edge in question shows signs of molten and re-solidified material then one must assume that it was laser-cut. There is in the applicant's experience no other technique for cutting such holes with molten edges into a belt; in particular ultrasound-cutting is not possible as it mandatorily produces cuts of only very low curvature, or it can even only produce straight cuts.

The belt or tape of the invention comprises as mandatory components a first textile layer (which normally will form a traction layer of the belt or tape), and a first coating layer, wherein either the first textile layer comprises a thermoplastic, or first coating layer comprises a thermoplastic or thermoplastic elastomer; or the first textile layer comprises a thermoplastic and simultaneously the first coating layer comprises a thermoplastic or thermoplastic elastomer.

The first textile layer may in one alternative be any fibre-containing layer of sheet-like constitution. Such sheet-like layer has essentially the shape of a cuboid with geometric length, geometric width and geometric thickness, wherein geometric length and geometric width are each much larger than geometric thickness. The textile may be a woven fabric (such as a plain woven or twill-woven fabric), a knitted fabric, a non-woven fabric (such as a felt or fleece)

In a second alternative the first textile layer may comprise or consist of an array of non-interwoven reinforcing cords running in parallel to each other.

Preferably the first textile layer is a woven fabric or an array of non-interwoven reinforcing cords.

The first textile layer preferably forms, or is comprised in, a traction layer of the belt. In order to take maximal advantage of the tensile properties of a textile, if in the form of a woven fabric, it appears preferable that the lateral edges of the belt are cut in such a way that the woven fabric's warp (=pick) filaments run in parallel to said lateral edges, and the woven fabric's weft (=fill) filaments run transversally to the said lateral edges.

The first textile layer may either be entirely of thermoplastic fibres or filaments, alternatively it may comprise thermoplastic fibres or filaments in admixture with natural fibres or filaments. The preferred thermoplastics are thermoplastic polyolefins; polyesters, in particular aromatic polyesters such as PET; aliphatic polyamides such as in particular nylons; or aromatic polyamides, such as aramid. The natural fibres or filaments are preferably selected from the group consisting of flax, jute, hemp, wool, cotton and ramie, most preferably the natural fibres are cotton. If the first textile layer comprises a combination of thermoplastic fibres or filaments to natural fibres or filaments, then the weight ratio of thermoplastic fibres or filaments to natural fibres or filaments is preferably in the range of 2:8 to 9:1.

The first coating layer comprises or preferably consists of a thermoplastic or thermoplastic elastomer. The preferred thermoplastics for the first coating layer are thermoplastic polyolefins (such as polyethylene or polypropylene), substantially random ethylene/$C_{3-12}$-α-olefin copolymers (examples of the α-olefin being 1-propene, 1-butene, 1-pentene, 1-hexene and 1-octene), thermoplastic polyamides, ethylene-vinylacetate copolymers, and poly(vinylacetate).

Homopolymers of vinyl chloride (PVC) or copolymers of vinyl chloride with vinylidene dichloride are technically also possible but less preferred in view of possible development of toxic fumes during laser or ultrasound cutting. Preferred examples of thermoplastic elastomer(s) for the cover layer are thermoplastic elastomeric block copolymers (such as styrenic block copolymers, in particular styrene-butadiene-styrene, styrene-isoprene-styrene, styrene-ethylene/butylene-styrene and styrene-ethylene/propylene-styrene block copolymers), copolymers of hard blocks of medium density polyethylene and of soft blocks of ethylene/α-olefin copolymers, thermoplastic polyurethanes (such as copolymers of polyester diols or polyether diols with diisocyanates), polyether-/ester block amides and thermoplastic elastomeric ionomers.

A more preferred example of the material for the first coating layer is a thermoplastic elastomer, in particular a TPU. Suitable such TPU's are generally obtainable by reacting diisocyanate-containing hard block segments with polyester diol soft block segments. The diisocyanate-containing hard blocks are obtainable by reacting a diisocyanate with a diol chain extender. The diisocyanate may be a pure compound or a mixture of diisocyanates. In one preferred embodiment the diisocyanate is an aromatic diisocyanate, more preferably one of the isomeric 2,2'-, 2,4'- or, preferably, 4,4'-diphenylmethane diisocyanates. Suitable diol chain extenders include aliphatic $C_2$-$C_6$-diols, such as ethylene glycol, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol and 3-methylpentane-1,5-diol, or glycol ethers, such as diethylene glycol, dipropylene glycol and tripropylene glycol, and aminoalcohols such as ethanolamine, N-methyldiethanolamine and the like. The polyester diol soft segments used preferably have a molecular weight of between 500 and 20000.

They may be prepared by reaction of a diol with a dicarboxylic acid, or, more conveniently, by reaction of a diol with the dimethyl ester of the dicarboxylic acid (transesterification) and boiling off the low-boiling methanol. Diols for the polyester diol are aliphatic linear or branched $C_2$-$C_8$ diols which optionally may contain a carbocyclic saturated $C_5$-$C_6$ ring. Examples therefor are ethylene glycol, propylene glycol, diethylene glycol, 1,4-butanediol, neopentyl glycol, 2-methylpropanediol, 3-methylpentane-1,5-diol, 1,6-hexanediol or cyclohexane dimethanol, and mixtures of such diols. The dicarboxylic acids for the polyester diol are aliphatic linear or branched $C_2$-$C_8$ dicarboxylic acids. Examples therefor are oxalic, malonic, succinic, glutaric and adipic acids or their dimethyl esters, sebacic acid, phthalic anhydride, tetrachlorophthalic anhydride or dimethyl terephthalate or mixtures thereof. The TPU is produced by reaction of the diisocyanate-containing hard block with the polyester diol soft segments, using respective free and reactive end groups. Most preferred TPU's are the Estane® types of Lubrizol. More preferred are Estane® 58277, Estane® 54600 and Estane® 54610; most preferred is Estane® 58277. The TPU's are preferably neither blended nor alloyed with other types of polymers.

The thermoplastics or thermoplastic elastomers suitable for the first coating layer, in particular the TPU's, preferably have at room temperature a Shore A hardness in the range of 60 to 100, more preferably of 70 to 95.

It is preferred that the first coating layer comprised at least 80% by weight, more preferably at least 90% by weight, still more at least 95% by weight and most preferably 100% by weight of a thermoplastic material or a thermoplastic elastomeric material as exemplified below. These amount indications are based on the overall weight of the first coating layer.

The thermoplastic in the first textile layer and the thermoplastic or thermoplastic elastomer in the first coating layer may be incompatible with each other. With "incompatible" is understood that a blend of the thermoplastic from the first textile layer with the thermoplastic or thermoplastic elastomer from the first coating layer exhibits two discrete glass transition temperatures in differential scanning calorimetry (DSC). The ultrasound or laser cutting brings about a fusing together of these two layers at the formed edges even in case of such incompatibility. A specific example of such incompatible material pair is a polyester (in particular PET or PBT) for the first textile layer and a thermoplastic polyurethane (TPU, in particular a TPU as exemplified above) for the first coating layer. Such textile and such coating layer can be fused together at the lateral edges with ultrasound or laser cutting even in the absence of processing aids such as homopolymers of acrylic acid esters and copolymers of acrylic acid esters with styrene, olefins and/or acrylonitrile.

It is preferred that first textile layer and first coating layer are either immediately adjacent to each other or are separated from each other only by an adhesive layer which may comprise either a hot-melt adhesive or a crosslinked adhesive, such as a crosslinked polyurethane.

The orientation of the belt or tape during its eventual application is however not critical. That is, the first textile layer may either face the driving pulleys, or it may form a conveying surface for a good to be conveyed (if the belt is used as a conveyor belt), or it may constitute a driving surface for an axle or pulley (e.g if the belt is used for power transmission).

The belt or tape of the invention may optionally comprise further textile layers and or one or more top coating layers. The constitution of the further textile layers may be analogously as described above for the first textile layer. The optional top coating layers may impart resistance to abrasion, chemical resistance, antibacterial properties, resistance to moisture and/or impart antistatic properties. Such top coating layers as such are conventional.

The top coating layer(s) may also be provided with an embossed profile to alter its friction coefficient. In a preferred embodiment there is a top coating layer having two longitudinally running portions of similar, preferably of equal transversal width, the two portions being adjacent to each other in transversal direction, and wherein the two portions exhibit different static coefficients of friction (COF) against steel or cardboard.

The belt of the invention may furthermore optionally comprise one or more through holes perforating the belt in its thickness direction. In this case a preferred application for such belt is as a vacuum-suction belt that allows to adhere a conveyed good by means of vacuum suction onto the conveying surface of the belt. In this case the belt will preferably have a plurality of such through holes, more preferably arranged in a certain pattern, such as a square or rectangular pattern, wherein the distance between adjacent through holes is not greater, preferably markedly smaller than, the dimension of the conveyed good, such as to guarantee vacuum suction of each such good that is placed onto the belt. An exemplary rectangular pattern of a plurality of such through holes 5 is shown in the bottom part of FIG. 1. These through holes are preferably of a circular cross-section, as shown in the lower part of FIG. 1, in which case their diameter is preferably in the range of 1 to 3 mm. Laser-cutting is in the experience of the applicant the only feasible technique for producing such through holes with partially molten and sealed hole edges.

The overall geometric thickness T of the belt or tape is customarily chosen such that it corresponds to the overall geometric thickness of one of the corresponding prior art belt or tape types mentioned in the introduction. As "geometric thickness" is understood herein a thickness measured with a thickness gauge using a defined overpressure (overpressure meaning pressure above ambient pressure, which is typically about 1 bar) of 0.2 bar. Preferably the overall geometric thickness T of the belt or tape is in the range of 0.5 mm to 15 mm, more preferably of 0.5 to 5 mm still more preferable of 0.5 to 2.5 mm.

The belt or tape of the invention preferably comprises a certain amount of entrapped gas. This may be in the first textile layer and/or in any of its optional further textile layers, that is, these textile layer(s) is(are) are incompletely impregnated or not impregnated at all. Alternatively or in addition thereto, the first coating layer may be the form of an open-cell foam. Such gas inclusion is beneficial during ultrasound or laser cutting because during ultrasound or laser cutting the gas can be expelled to the environment, thus possibly compensating for any volume expansion (bulging up) of the belt or tape near the lateral edges that are ultrasound or laser cut. The gas content G of the belt or tape [in vol %] in this preferred embodiment is preferably in the range of 5% to to 20%, wherein G is calculated according to the formula $$G = 100\% \times \frac{V_{GeoB} - V_R \left( \frac{1 - \dot{P}_3/\dot{P}_1}{1 - \dot{P}_2/\dot{P}_1} \right)}{V_{GeoB}}$$

wherein
- $V_{GeoB}$ is the geometric volume of a cuboid belt or tape sample to be tested; obtained on the cuboid belt or tape sample by geometric length and width measurement and geometric thickness measurement by thickness gauge under 0.2 bar overpressure as outlined above; $V_R$ is the volume of a reference sample with defined, known volume;
- $\dot{P}_1$ is the initial pressure rise over time ($dP_1/dt$ at t=0) measured in a fully evacuated vacuum chamber when it is flooded with Helium using a Helium permeation leak standard;
- $\dot{P}_2$ is the initial pressure rise over time ($dP_2/dt$ at t=0) measured in said vacuum chamber when said vacuum chamber, containing said reference sample and being fully evacuated, is flooded with Helium using said Helium permeation leak standard;
- $\dot{P}_3$ is the initial pressure rise over time ($dP_3/dt$ at t=0) measured in said vacuum chamber when said vacuum chamber, containing said cuboid belt sample and being fully evacuated, is flooded with Helium using said Helium permeation leak standard; and $\dot{P}_1$, $\dot{P}_2$ and $\dot{P}_3$ are measured in said vacuum chamber at room temperature using a spinning rotor vacuum gauge.

The above volume percent determination over differential pressure rises as such is by itself known. See e.g. the publication "Volume Determination of a Vacuum Vessel by Pressure Rise Method", by Setina J. and Erjavec B., presented at the XIX$^{th}$ IMEKO World Congress "Fundamental and Applied Metrology" 6-11 Sep. 2009 in Lisbon; and literature cited therein. The "initial pressure rise over time" can also be taken from a non-infinitesimally small time period, that is as $\Delta P/\Delta t$ instead of as $dP/dt$, because the pressure rise initially is a straight line.

In a further preferred embodiment, which may be alone or in combination with the preferred embodiment of gas entrapment described above, the textile is a woven fabric with warp and weft filaments with the warp filaments running essentially, but not exactly, in the belt's longitudinal direction. Namely, during cutting of the belt's or tape's lateral edges by any technique (whether conventional or according to the invention), it cannot be guaranteed that the lateral cut edges will be exactly parallel to said warps. Accordingly also it cannot be guaranteed either that the warps run exactly in the belt's or tape's longitudinal direction. If the lateral edges are (prior art) knife-cut and the warps do not run exactly parallel to them then they may have an increased tendency to fray, because the warps at the lateral edges may have been damaged or even cut apart, forming open ends. This problem is acerbated if the warps are in the form of multifilaments consisting of a plurality of fine fibres (as is customary, in order to improve bendability of the belt or tape over small radius pulleys). Belts having a woven fabric and lateral edges cut by ultrasound or laser exhibit no fraying even when the (particularly multifilament) warps of the fabric are slightly skewed with respect to the belt's longitudinal direction, such as by an angle of 0.1 to 1°, or by 0.1 to 0.5°. The term "skewed" here may mean either that the average direction of the warps, averaged over the entire length of the belt, is skewed by the indicated angle. It may alternatively mean that the local direction of the warps, e.g. in a longitudinal section of the belt or tape of 2-5 cm, may have such angle with respect to the longitudinal belt or tape direction.

The belt or tape according to the invention may be in open-ended form, comprising two ending edges 6,7 as shown in the bottom part of FIG. 1, which will be joined together to form the corresponding endless form (see below). In this open-ended form it has a longitudinal length L, whereas in the corresponding endless form it has a perimeter L. If the two ending edges are straight then the belt, when seen in a top view, has the shape of an elongated strip, preferably in the shape of a very elongated rectangle or parallelogram. For end-joining purposes however the two ending edges are preferably shaped into a regular saw tooth-like shape, each ending edge having identical teeth and identical recesses in alternating fashion, such that upon end-joining each tooth of one ending edge will snugly fit a corresponding recess of the other ending edge, and vice-versa. This end-joining technique is commonly called the "fingerend" joining technique and is preferred for the purposes of the invention. In the case of such saw-toothed ending edges, the open-ended belt of the invention will look in a top view similar as shown in the bottom part of FIG. 1.

The belt or tape of the invention, whether open-ended or endless, has a width W which is generally constant and is typical for a belt for industrial application. For power transmission belts and machine tapes the width W may preferably be in the range of 10 mm to 25 mm, more preferably of 10 mm to 20 mm, which is a preferred application for the machine tape of the invention (see below). The lateral edges are preferably straight, parallel to each other and spaced apart from each other in transversal (z-) direction by said constant width W.

The longitudinal length L of a open-ended belt or tape of the invention or the perimeter L of an endless belt or tape of the invention is understood as the quotient obtained by dividing the geometrical surface area of the belt or tape by said constant width W. The geometric surface is generally obtainable for either open-ended or endless belts or tapes by weighing the belt or tape and comparing this weight with the weight of a planar specimen of the same belt or tape with known geometric area, such as 0.01 m$^2$. In the above mentioned preferred open-ended belts or tapes of elongated rectangle or parallelogram shape with straight ending edges the longitudinal length L is also obtainable, with identical result within experimental error, as the length of one of the lateral edges (rectangle) or as the average of the lengths of the two lateral edges (parallelogram). In the above mentioned preferred open-ended belt or tape with saw-toothed "fingerend" ending edges the longitudinal length L is also obtainable, with identical result within experimental error, as the longitudinal distance from the half-height of a tooth of one ending edge 6 to the half-height of a tooth of the other ending edge 7, as shown in the lower part of FIG. 1.

In another preferred embodiment of the invention the belt or tape is endless. In this endless form it has a periphery L which essentially corresponds to the longitudinal length L of the open-ended belt or tape from which it was made. That periphery L may run along the "pitch line" or "neutral line" of the endless belt, that is, the line internal to the endless belt that does not change length when the endless belt is in use. The term "periphery" shall refer herein, as customary in the art, to both a physical peripheral lateral edge of the endless belt and to the associated length L of such peripheral lateral edge. The end-joining to make the belt or tape endless is typically done as the last step and is as such customary, using a hot-press and optionally a hot-melt adhesive.

The ratio of width W to longitudinal length L (or to perimeter L) in the foregoing senses is preferably in the range of 1:100 to 1:2'000, preferably of 1:150 to 1:2'000 and more preferably of 1:200 to 1:2'000.

Any belts and tapes of the invention are preferably in the form of a so-called "flat belt", that is, a belt or tape devoid of transversally running teeth and associated recesses on its top and bottom surfaces and/or devoid of longitudinally running grooves and associated ridges on its top and bottom surfaces.

The belt or tape of the invention can be used in any application where a corresponding conventional conveyor belt, power transmission belt, or machine tape with identical layer construction, but with knife-cut edges, would have been employed. If all edges contained therein are ultrasound-cut or laser-cut then it is in particular applicable in any uses where particulate dust or fibre fluff may be formed during use and which may contaminate the edges. Such belt or tape of the invention withstands accumulation of such dust or fluff at or in the edges due to their melt-sealing. In view of this advantageous property, such belt or tape of the invention may be used in such dust or fluff-generating environments even if it is devoid of antistatic equipment, such as coatings having embedded antistatic particles or fabrics containing antistatic filaments. A further application for belts or tapes of the invention where all edges are ultrasound-cut or laser-cut is in an environment where solvents, such as acetone, might contaminate the belt or tape.

It was observed that the sealing of the edges by partial melting prevents such solvents from penetrating into the belt or tape. Examples of such applications are in the paint or cosmetics industries or in chemical plants where such solvents are manufactured or packaged.

A still further application for belts or tapes of the invention where all edges are ultrasound-cut or laser-cut is in an environment where mould or bacterial might contaminate the belt or tape. It was observed that the sealing of the edges by partial melting prevents such microorganisms from penetrating into the belt or tape. Examples of such applications are in food industry.

A preferred application however is the use of the inventive machine tape as a spindle tape. Spindle tapes are customarily used in ring spinning frames of the type where the spindles are driven by an endless tape loop, which is formed by said spindle tape. This is one such use where fluff is formed during operation.

There are variants of ring spinning frames where two, four or eight spindles are driven by one spindle tape, and the inventive spindle tape is suited for all of them.

It was confirmed that the spindle tape of the invention does not accumulate at all abraded fluff on its ultrasound-cut or laser-cut edges, even after prolonged use (see the examples and associated figures).

A schematic representation of a belt or tape 1 of the invention is shown in the upper part of FIG. 1. It contains a first textile layer 2 and a first coating layer 3. The first textile layer 2 consists of a woven fabric of mixed PET/cotton filaments (50:50). One of the ultrasound-cut or laser cut lateral edges is indicated with numeral 1 a. First textile layer 2 and first coating layer 3 are adhered together by means of an adhesive layer 4 comprising a crosslinked polyurethane. The belt or tape furthermore comprises optional through holes perforating it (one shown with reference numeral 5). Each such through hole 5 is formed by a hole edge 5a which must be laser-cut. The lower part of FIG. 1 shows a top view of a belt or tape of the invention with a plurality of through holes (only one designated with numeral 5).

Cutting of edges of the belt or tape of the invention by ultrasound or laser will be described in detail below.

The ultrasound cutting process is used for either lateral edges, where one or more belts are cut out of a broader layered sheet material (a master tape), or for cutting of ending edges.

Generally the ultrasound cutting is essentially adiabatic. That is, any heat introduced by the ultrasound cutter at a given location of the edge being cut remains, at least for the time where the ultrasound cutting blade is at that location, essentially at that location without being removed therefrom by any explicit cooling means such as air or inert gas blown or otherwise applied immediately to that location. Accordingly an ultrasound cutter, when used in the process of the invention, does not have, employ or require explicit cooling means, such as ducts, pipes, hoses, nozzles or fans, that could convey a cooling means, such as air or inert gas, immediately to the cutting zone(s) on the belt or tape surface(s). It is however understood that in the case of ultrasound cutting the blades and/or horns and/or sonotrodes may be cooled by such cooling means.

The ultrasound is preferably in the frequency range of 20 kHz to 100 kHz, more preferably of 20 kHz to 40 kHz, most preferably about 30 kHz. This relates to the resonance frequency at which the sonotrode in combination with the one or more cutting blade(s) normally operate and is a constant specific for the combination of sonotrode and cutting blade(s).

The vertical amplitude of the ultrasound oscillation (that is, in the cutting direction) is preferably in the range of 10 m to 100 m, more preferably in the range of 15 μm to 60 μm.

The power of the ultrasound, and the advancing speed of the blade(s) should however be chosen such that a certain amount of energy per unit of surface area (Joule/m$^2$) of the lateral belt or tape side is applied, such that the cut edges do not significantly bulge up in thickness with respect to the belt's or tape's bulk thickness, but that nevertheless there is enough local heating that the cut edge is sealed off by molten thermoplastic or thermoplastic elastomer material from the textile in the traction layer and/or other layer(s) coated or laminated onto the traction layer. At a frequency of 30 kHz it is e.g. preferred to use a power of 200 to 400, more preferably 250 to 350 Watts per cutting blade. Lower frequencies may require higher power per cutting blade; e.g. lowering the frequency from 40 kHz to 20 kHz (by a factor of 2) may require 4 times more of power per cutting blade.

In order to achieve both sufficient edge sealing and absence of bulging up for a given belt or tape type, at given cutting direction (e.g. parallel to the warp of the woven first fabric, or parallel to the weft of of the woven first fabric), at given resonance frequency of sonotrode/blade(s) and at given type and number of blade(s) that are driven by the sonotrode there is an optimal advancing speed v of the blade(s) relative to the sheet material [in m/min] which is approximately proportional to the nominal power P [in Watts] of the employed ultrasound cutter:

$$\frac{v}{P} = \text{constant}_1 \tag{1}$$

The constant$_1$ in (1) can be found, for a given and fixed combination of sheet material, sonotrode/blade(s) and ultrasound frequency, by varying the advancing speed v, and observing at which v both the above aims are attained. Dividing that optimal value of v by the used ultrasound power P gives the constant required in (1).

Figure 2:
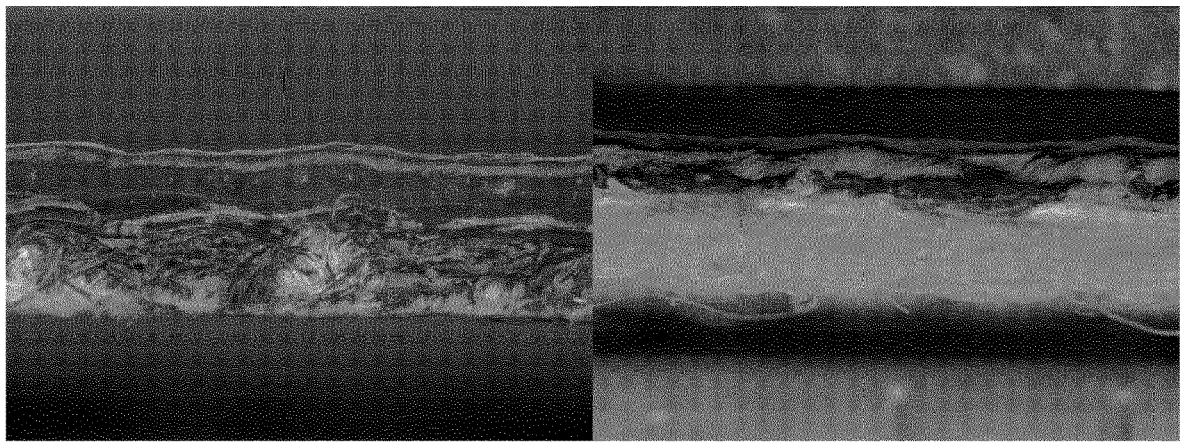
FIG. 2 shows two photographs of an ultrasound-cut lateral edge of two different specimens of spindle tapes constructed as shown in FIG. 1, at 100× magnification; left: 1st specimen, right, 2nd specimen.
Figure 3:
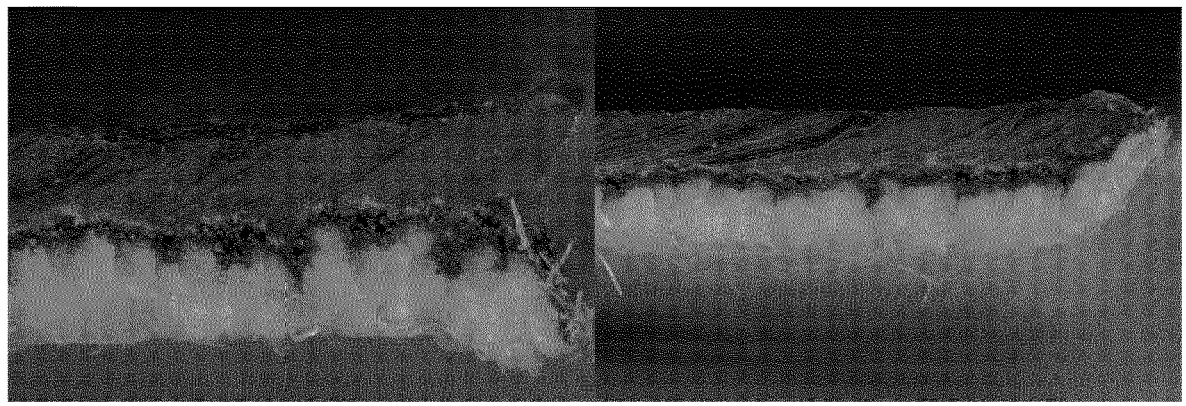
FIG. 3 shows two photographs of transversal cross-sections of the same two spindle tape specimens of FIG. 2, at 150× magnification; left: 1st specimen, right, 2nd specimen.

FIGS. 2 and 3 show the effect of varying the advancing speed of the blade(s) with other process parameters remaining constant. Namely the left photograph in FIG. 2 and the left photograph in FIG. 3 show the ultrasound-cut lateral side 1a and the cross-section, respectively, of a spindle tape having a construction as shown in FIG. 1, wherein the advancing speed v of the blade(s) has been slightly too great. The left photograph of FIG. 2 shows a sufficient lateral edge sealing: The white fabrics and the black TPU from the first coating layer have been extensively smeared and molten together. However the left photograph of FIG. 3 shows on its right side that there is some bulging up near the lateral edge: The bulk of the tape has a thickness of slightly more than 0.6 mm, but near the lateral edge the thickness increases to slightly more than 0.8 mm. This spindle tape would nevertheless be suited for practical use. On the other hand, the right photograph in FIG. 2 and the right photograph in FIG. 3 show the ultrasound-cut lateral side 1a and the cross-section, respectively, of a spindle tape having a construction as shown in FIG. 1, but wherein the advancing speed v of the blade(s) has been clearly too low. The right photograph of FIG. 2 shows insufficient lateral edge sealing: The white fabrics and the black TPU from the first coating layer have essentially not been smeared and molten together. The right photograph of FIG. 3 shows on its right side that there is no bulging up at all, on the contrary there is even a slight lowering in thickness near the lateral ultrasound-cut edge. In view of the insufficient edge sealing this spindle tape specimen would presumably perform unsatisfactorily during use.

It is preferred that the advancing speed v of the cutting blade(s) remains below a critical advancing speed at which the cutting resistance becomes so strong that the ultrasound cutter drops out of resonance, which is detectable in particular by a pronounced drop in oscillation amplitude. There are ultrasound cutters on the market that monitor the oscillating frequency and amplitude, and which, if a drop out of resonance occurs, automatically increase the applied power. The suitable optimum advancing speed v, for the belt types exemplified above, will in most cases or even generally be in the range of 2 m/min to 10 m/min, preferably of 3 m/min to 8 m/min, more preferably of 5 m/min to 7 m/min, at a power of 250 to 350 Watts per blade.

Once constant, for formula (1) is known then, for the same given and fixed combination of sheet material, sonotrode/blade(s) and ultrasound frequency, formula (1) allows to approximately predict which advancing speed v must be chosen for a given ultrasound power.

Figure 7:
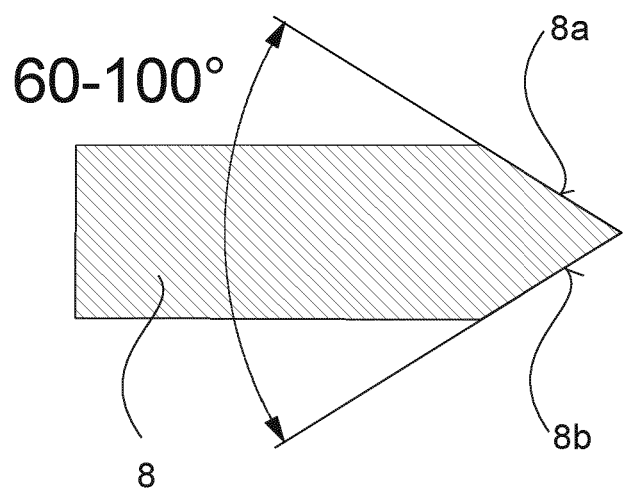
FIG. 7 shows a cross-section of a preferred ultrasound cutting blade.
Figure 8:
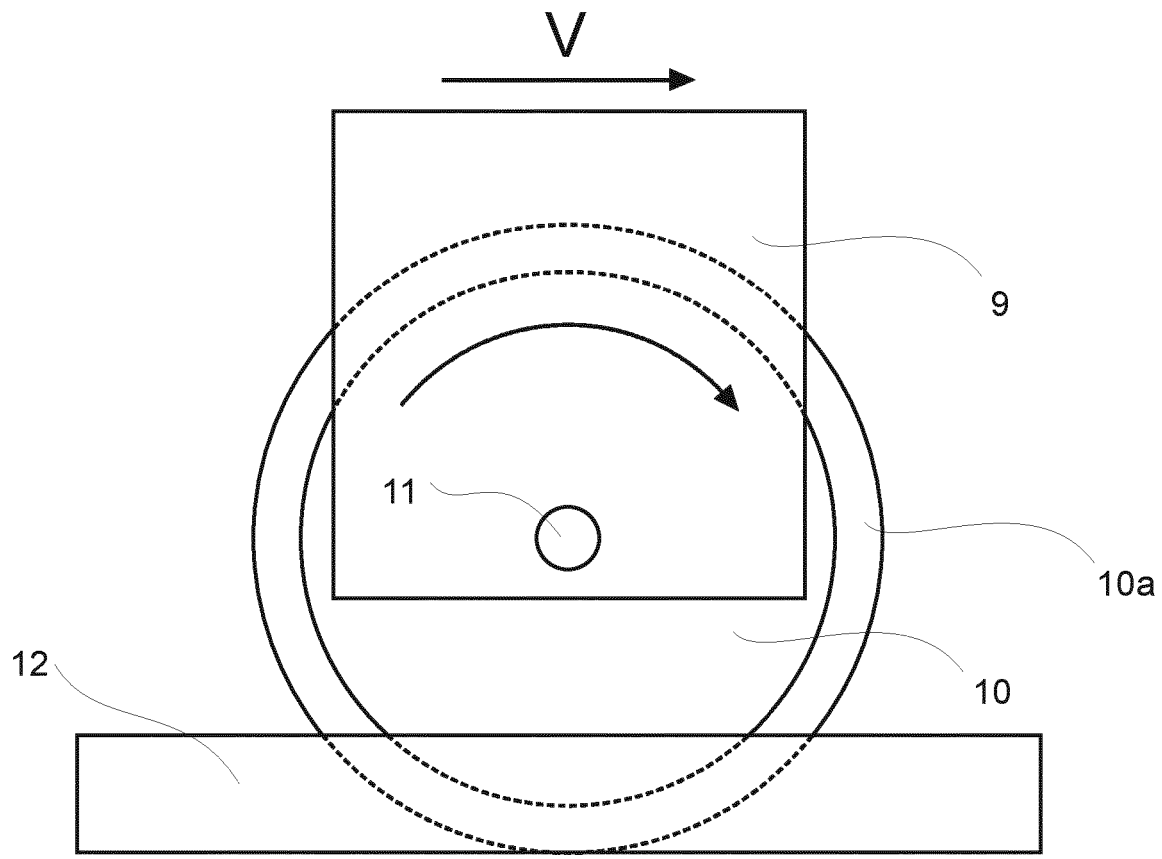
FIG. 8 shows a preferred ultrasound cutting blade in the form of a circular disk, when used in ultrasound cutting

The cutting blade(s) 8 preferably has(have) Cs symmetry wherein the mirror plane is parallel to the forward moving direction of the blade(s) relative to the belt or tape to be cut and parallel to the ultrasound oscillation direction. In this way equal power flows to either side of the blade is guaranteed, to produce two identically ultrasound cut lateral sides. The cutting faces 8a, 8b of the blade 8 are preferably planar and are preferably at an angle of 60° to 100°, preferably of 70 to 80°, with respect to each other, as shown in FIG. 7. More preferably the blade(s) are in the form of a disk 10 having peripheral circular cutting faces (as evidenced by FIG. 8). One of the circular peripheral cutting faces is designated with numeral 10a. Such disk-shaped blade 10 can be rotatably mounted onto the sonotrode 9 over an axle 11. During ultrasound cutting at an advancing speed V such disk-shaped blade(s) 10 simultaneously also roll(s) over the belt material 12 to be cut into one or more belts or tapes. The same preferred features concerning the cutting faces and their respective angle as explained above for the blades in general also apply to such rotable disk-shaped blades 10.

In a preferred process embodiment several belt or tape specimens are cut simultaneously from a sheet material (master tape) using a plurality of blades. In this embodiment the sheet material preferably has a width $W_o$ of 400 to 500 mm; and is cut by an ultrasound cutter having preferably 3 to 4 sonotrodes, each of them preferably driving 10 to 12 blades, the ultrasound frequency preferably is about 30 kHz, the power for each sonotrode is preferably in the range of 300 to 400 Watt, and the advancing speed is preferably in the range of 3 to 5 m/min, it being understood that the foregoing considerations for the advancing speed are observed.

The sonotrodes 9 preferably are side slitting, that is, it(they) preferably cut by sawing action, rather than by punching action. For this preferred way of cutting it (they) preferably have at least in one variant a straight lateral cutting edge which tapers towards the blade tip, such as preferably at an angle in the range of 5 to 45 degrees with respect to the direction of the ultrasound vibration. In an alternate preferred embodiment of side slitting/sawing action, the blades may have a cutting edge facing downwards and having the shape of an approximately circular or oval arc.

The direction of the ultrasound vibration, and thus the oscillating direction of the blade(s) during cutting, is preferably perpendicular to the surface of the sheet material to be cut into belts, when seen in the cutting direction; but slightly oblique with respect to the belt surface normal, when seen in a direction transversal to the cutting direction. That oblique angle with respect to the sheet material surface normal is preferably from 5° to 40°, more preferably from 20 to 40°, most preferably about 30°.

The ultrasound cutting equipment as such, including the sonotrode(s) and blade(s), is conventional. Preferably it is an equipment customarily used in the fields of food slicing or garment cutting.

The laser cutting process may be used for any edges of the belt or tape. In the laser cutting process the heat introduced by the laser cutter is preferably removed from the cutting zone by cooling means such as air or inert gas blown directly to the cutting zone. Accordingly a laser cutter used in the process of the invention preferably has and employs explicit cooling means, such as ducts, pipes, hoses, nozzles or fans, that convey a cooling means, such as air or inert gas, immediately to the cutting zone on the belt or tape surface.

In order to achieve with laser cutting both sufficient edge sealing and absence of bulging for a given belt or tape type, a given cutting direction (e.g. parallel to the warp of the woven first fabric, or parallel to the weft of of the woven first fabric), a given belt or tape thickness d [in m] and a given laser type the optimal advancing speed v of the laser relative to the sheet material [in m/min]), is approximately proportional to the intensity of the employed laser beam:

$$\frac{v \times d}{I} = \text{constant}_2 \qquad (2)$$

The $\text{constant}_2$ in (2) can be found for a given belt or tape type by varying the advancing speed v, at fixed laser intensity and fixed cutting direction, and observing at which v both the above aims are attained. This is also an one-parameter variation well within the capability of the skilled person. Dividing that optimal value by the used laser intensity gives the constant required in (2).

Analogously, once $\text{constant}_2$ for formula (2) is known, then for the same belt or tape type and cutting direction, formula (2) allows to approximately predict which advancing speed v must be chosen for a given laser intensity.

The employed laser is preferably a $CO_2$ (infrared) laser. More preferably it is a "slab" $CO_2$ laser, even more preferably wherein the two reflecting mirrors are shaped such as to provide an unstable behaviour in the unrestricted dimension of the resonator. The resonator of the slab laser is preferably of a ceramic, e.g. selected from the group consisting of $Al_2O_3$, BeO and AlN. The exciting electrodes are then outside the ceramic resonator which allows better cooling of the electrodes. The use of a ceramic resonator instead of a metal (aluminium) resonator was found to improve the shape of the edges so cut.

The preferred power range for the laser is 100 to 200 Watts.

Figure 5:
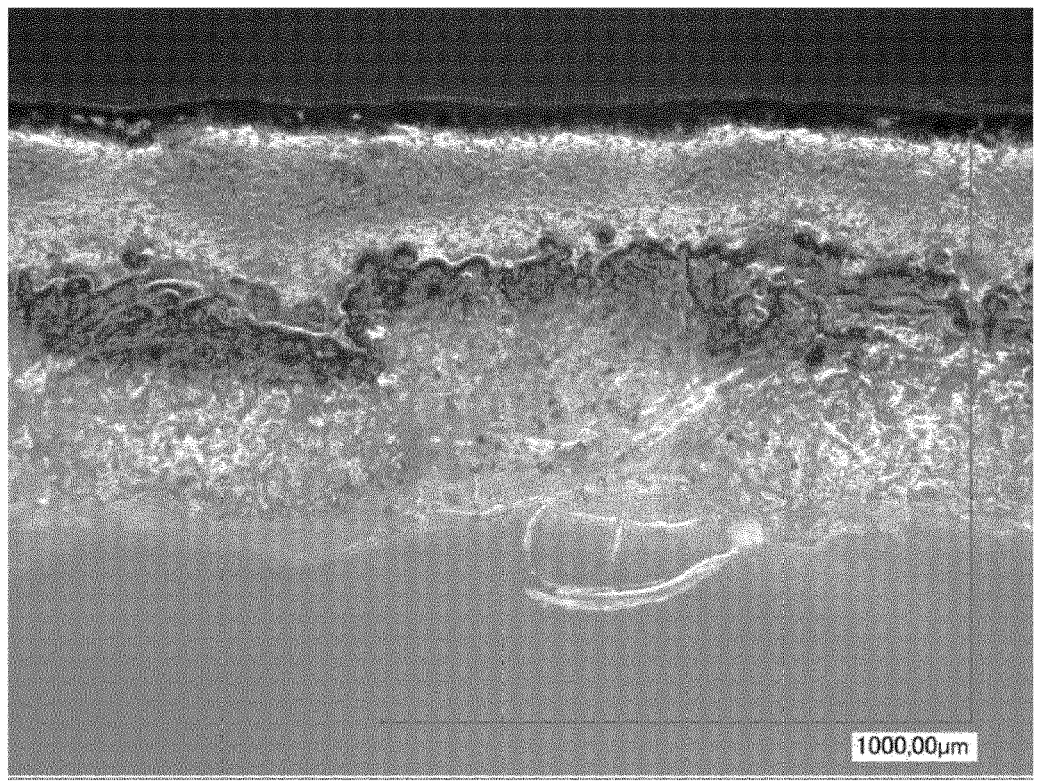
FIG. 5 shows a photograph of a laser-cut lateral edge of a spindle tape of the invention constructed as shown in FIG. 1.
Figure 6:
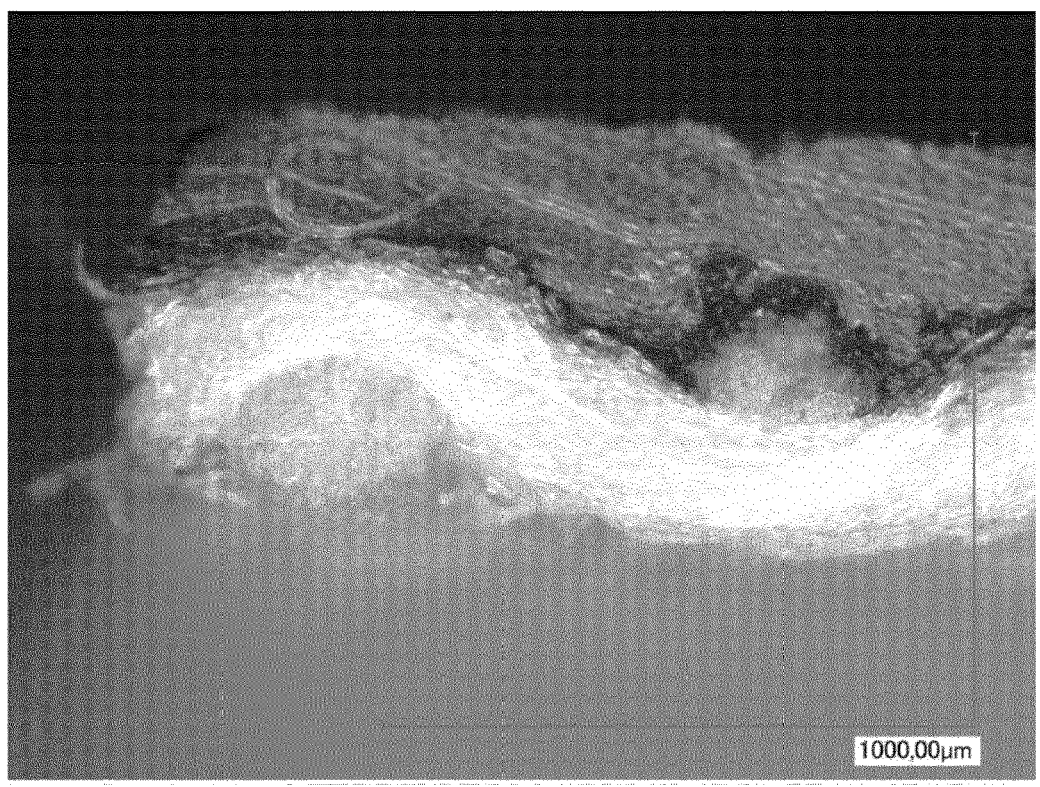
FIG. 6 shows a photograph of a transversal cross-section of the same specimen of spindle tape as in FIG. 5.

FIGS. 5 and 6 show photographs of a laser-cut lateral edge and of a transversal cross-section, respectively, of a specimen of the spindle tape of the invention, constructed as shown in in the upper part of FIG. 1. The essentially complete smearing of white fabric and black TPU due to the melting of the edge material is clearly visible in FIG. 5. On the other hand, FIG. 6 shows that no bulging up of the tape near the lateral edges occurs.

The invention will now be illustrated by the following non-limiting examples.

EXAMPLES

Example 1: Simultaneous Manufacture of a Plurality of Spindle Tapes by Ultrasound Cutting of their Lateral Edges from a Master Tape A master tape of width of 500 mm, thickness of 0.7 mm, and a weight per unit area of 0.7 kg/m$^2$, having a layer construction similar as found in the applicant's commercial spindle tape D-8, was used as the starting layered sheet material.

This master tape is mounted on the feeding roll of a commercial multi-blade ultrasound cutter (TCU400 of Fabotex, having 4 sonotrodes and a total of 40 blades, operating at 30 kHz and total 1500 Watts). The blades are spaced from each other by 12.7 mm. The master tape is passed through the ultrasound cutter at an advancing speed of 3 m/min. 39 specimens of a spindle tape of the invention, each having a width of 12.7 mm, are simultaneously obtained, wherein a few millimetres of selvage from each of the borders of the master tape are discarded.

Example 2: Field Test of Conventional Spindle Tapes (Lateral Edges Knife-Cut) Cut and Inventive Spindle Tapes (Lateral Edges Ultrasound-Cut)

Figure 4:
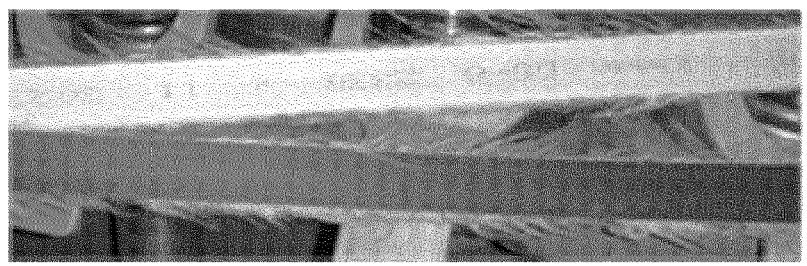
FIG. 4 shows photographs of a conventionally cut spindle tape (top) and of a inventive spindle tape as shown in FIG. 1 (bottom), both after two month use in a ring spinning frame.
Figure 4:
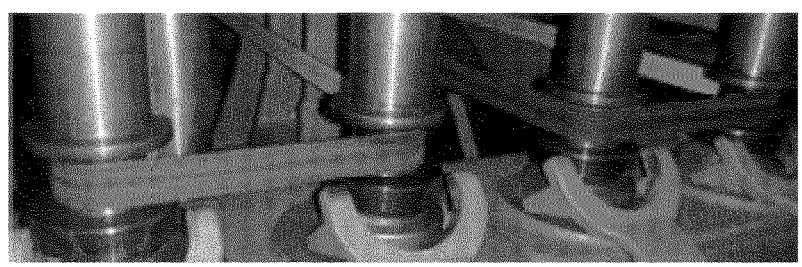

A ring spinning frame with four spindle tape drives was equipped with either spindle tape specimens prepared according to the procedure of Example 1 or with specimens of a reference spindle being constructed identically, except that the lateral edges were simply knife-cut without any further measures being taken against fluff contamination of the lateral edges. The ring spinning frame was run in each case for two months, with the spindles running at at least 18'000 rpm. After 2 months service time the spindle tapes were inspected for fluff contamination. FIG. 4 shows photographs of the two types of spindle tapes. The top photograph shows the state of the reference spindle tape. The edges have a notable amount of whitish fluff protruding perpendicularly from the edges. In contrast thereto, the inventive spindle tapes are completely devoid of fluff at the edges (lower photograph from FIG. 4).

The invention claimed is:

1. A tape being open-ended with two ending edges and with a longitudinal length L in a longitudinal direction, the tape being suitable for a conveyor belt, power transmission belt, or machine tape, the tape comprising:
   a) two parallel lateral edges each running in said longitudinal direction and being spaced apart from each other by a transversal width W;
   b) a first textile layer;
   c) a first coating layer; and optionally
   d) one more through holes perforating the belt through its overall thickness T, each of these through holes being formed by a hole edge;
   characterized in that
   i) the first textile layer comprises fibres or filaments of a thermoplastic and the first coating layer comprises a thermoplastic or thermoplastic elastomer; and
   ii) the lateral edges are ultrasound-cut or laser-cut and appear re-solidified after at least partial melting.

2. The tape according to claim 1, wherein the first textile layer comprises natural fibres or natural filaments.

3. The tape according to claim 1, wherein the first textile layer comprises fibres or filaments of a polyester, in particular PET.

4. The tape according to claim 1, wherein the first coating layer consists of a TPU.

5. The tape according to claim 1, wherein said transversal width W is in the range of 10 to 25 mm.

6. The tape according to claim 1, comprising one or more of said through holes and the hole edge(s) of the through hole(s) is(are) laser-cut.

7. The tape according to claim 1, wherein said two lateral edges are ultrasound-cut.

8. The tape according to claim 1, which is devoid of through holes and wherein said two lateral edges are ultrasound-cut or laser-cut.

9. The tape according to claim 1, wherein the two ending edges which are spaced apart from each other in said longitudinal direction by said longitudinal length L are laser-cut.

10. The tape according to claim 1, wherein the ratio of width W to longitudinal length L is in the range of 1:100 to 1:2000.

11. An endless conveyor belt, obtained by making a tape suitable for a conveyor belt of claim 1 endless; an endless power transmission belt obtained by making a tape suitable for a power transmission belt of claim 1 endless; or an endless machine tape obtained by making a tape suitable for a machine tape of claim 1 endless; wherein the endless form is obtained by joining the two ending edges.

12. A process for the simultaneous production of N specimens of the tape according to claim 1 and with ultrasound-cut lateral edges, wherein N is an integer number≥1, comprising the steps of:
   i) providing a layered sheet material of essentially rectangular shape having a layer structure as defined in claim 1, a longitudinal length greater than or equal to L and a transversal width $W_0$ which is greater than N×W;
   ii) passing said layered sheet material through an ultrasound cutter having at least one sonotrode and N+1 blades, wherein adjacent blades are spaced apart from each other by that distance W, such that each of the blades cuts into the sheet material, to simultaneously cut the sheet material into said N specimens; and
   iii) optionally, forming one or more through hole(s) into each of the said N specimens by laser-cutting.

13. The process of claim 12, wherein the ultrasound cutter has M ultrasound sonotrodes, each i-th sonotrode driving $K_i$ blades, wherein M and each $K_i$ are integer numbers≥1, and wherein $$N = \sum_{i=1}^{M} K_i - 1.$$

14. The process of claim 12, wherein the blade(s) is(are) circular disk blade(s) having peripheral circular cutting faces, and the circular disk blade(s) roll over the layered sheet material during ultrasound cutting of the specimen(s).

15. The process of claim 12, wherein the layered sheet material is passed through the ultrasound cutter at an advancing speed in the range of 2 to 10 m/min, using in each sonotrode an ultrasound with a frequency of 30 kHz and power of 250 to 350 W per blade attached to that sonotrode.

16. A ring spinning frame with two, four or eight spindle tape drives, comprising as the spindle tapes endless machine tapes according to claim 11, wherein the transversal width W is in the range of 10 to 25 mm.

\* \* \* \* \*